(12) United States Patent
Kroemer et al.

(10) Patent No.: US 7,287,437 B2
(45) Date of Patent: Oct. 30, 2007

(54) FLOW METER FOR FLUID OR GAS-LIKE MEDIA

(75) Inventors: Harald Kroemer, Ansbach (DE); Wilhelm Ofelein, Ansbach (DE); Gunter Hauenstein, Maintal (DE)

(73) Assignee: Hydrometer GmbH, Ansbach (DE)

( * ) Notice: Subject to any disclaimer, the term of this patent is extended or adjusted under 35 U.S.C. 154(b) by 0 days.

(21) Appl. No.: 11/353,744

(22) Filed: Feb. 14, 2006

(65) Prior Publication Data
US 2006/0196278 A1    Sep. 7, 2006

(30) Foreign Application Priority Data
Feb. 17, 2005  (DE) ...................... 10 2005 007 241

(51) Int. Cl.
*G01F 1/66* (2006.01)
(52) U.S. Cl. ................................... 73/861.25
(58) Field of Classification Search ...................... None
See application file for complete search history.

(56) References Cited

U.S. PATENT DOCUMENTS

| | | | | |
|---|---|---|---|---|
| 4,555,951 A | * | 12/1985 | Gutterman ............... | 73/861.28 |
| 4,610,167 A | | 9/1986 | McShane | |
| 5,372,047 A | * | 12/1994 | Russwurm et al. ...... | 73/861.29 |
| 5,390,204 A | * | 2/1995 | Yessik et al. ............ | 372/38.02 |
| 5,440,937 A | * | 8/1995 | Lynnworth et al. ...... | 73/861.29 |
| 5,583,301 A | * | 12/1996 | Strauss et al. ........... | 73/861.29 |
| 5,650,572 A | * | 7/1997 | Vontz ...................... | 73/861.28 |

FOREIGN PATENT DOCUMENTS

DE           4336369              6/1995

* cited by examiner

*Primary Examiner*—Harshad Patel
(74) *Attorney, Agent, or Firm*—Fitch, Even, Tabin & Flannery

(57) ABSTRACT

The invention relates to a flow meter for liquid or gaseous media, the flow meter has a measuring channel through which the medium flows, at least one inlet channel and at least one outlet channel and also at least one pair of ultrasound converters for emitting and receiving ultrasound signals, wherein for guiding an ultrasound signal from one ultrasound converter to the other ultrasound converter, at least one pair of reflectors is arranged in the measuring channel, the diameter of the measuring channel is reduced using a reducer in certain regions for guiding the flow of the medium, wherein the reducer is formed by a measuring channel insert, which is arranged on and/or integrated into the measuring channel inner wall, and which is used simultaneously for holding or fixing other functional parts. Furthermore, the invention relates to a flow meter, in which a flow guide plate is used as a holding plate for the pair of reflectors and stretches in the longitudinal direction of the measuring channel. In another embodiment at least two measuring sections each having at least one pair of reflectors and one pair of ultrasound converters are provided.

49 Claims, 8 Drawing Sheets

Figure 1:
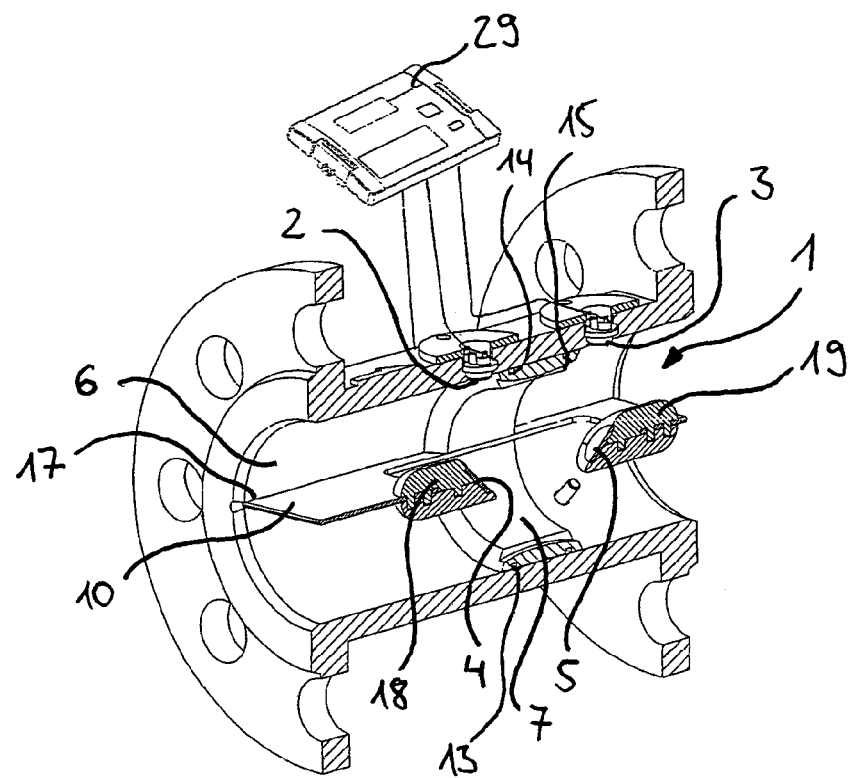

$$a_1 \sin(\omega t + \varphi_1) + a_2 \sin(\omega t + \varphi_2) = a \sin(\omega t + \varphi) \qquad a = \sqrt{a_1^2 + a_2^2 + 2a_1 a_2 \cos(\varphi_2 - \varphi_1)}$$

$$\sin \varphi = \frac{a_1 \sin \varphi_1 + a_2 \sin \varphi_2}{a}$$

FLOW METER FOR FLUID OR GAS-LIKE MEDIA

For ultrasound flow measurement, flow meters comprising a measuring channel through which the medium flows and also an inlet channel and an outlet channel are known from prior art, wherein at least one pair of ultrasound converters is provided for emitting and/or receiving ultrasound signals. As described in DE 100 47 383 C1, a pair of reflectors is arranged in the measuring channel for guiding the ultrasound signal from one ultrasound converter to the other ultrasound converter, so that a U-shaped deflection of the ultrasound signals takes place. Inside the measuring section and/or in the inlet region, asymmetrical or radially disturbed flow profiles can occur, which lead to a falsification of the measurement results.

It is also known from prior art that the diameter and/or cross-section of the measuring channel can be reduced at least in certain regions for reducing the flow guidance of the medium, in order to attain a sufficiently high flow velocity in the measuring range, in order to largely eliminate possible asymmetrical flow profiles.

It is the object of the present invention to further improve a generic flow meter in such a way that the measurement accuracy is increased.

The invention includes a flow meter for liquid or gaseous media having a measuring channel through which the medium flows. The measuring channel has at least one inlet channel and at least one outlet channel and also at least one pair of ultrasound converters for emitting and receiving ultrasound signals. The flow meter has at least one pair of reflectors is arranged in the measuring channel, the diameter of the measuring channel is reduced using a reducer in certain regions for guiding the flow of the medium. The reducer is formed by a measuring channel insert which is arranged on and/or integrated into the measuring channel inner wall, and which is used simultaneously for holding or fixing other functional parts.

According to the invention a reducer is provided, which is formed by a measuring channel insert, which is arranged on and/or integrated on the measuring channel inner wall and which serves simultaneously as the holder and fixation for additional functional parts. Its advantage and/or double function is that firstly the measuring channel is reduced and the medium is guided accordingly through the measuring channel. This in turn ensures correspondingly high measurement accuracy. Secondly, the reducer is used as a holder or fixation for additional functional parts so that other holding devices or the like can be omitted. Furthermore, the housing of the measuring channel and the measuring channel insert are made out of different materials. In particular, the housing can be made out of brass, red or coated gray cast iron, aluminum, stainless steel or plastic, while the measuring channel insert is preferably manufactured out of plastic.

The diameter of the measuring channel can be advantageously reduced in the region of the measuring section, especially between the integral pair of reflectors. An ultrasound path can be formed according to the U-ray principle using the two ultrasound converters and also the two reflectors, i.e. the measuring zone for the flow velocity lies between the two reflectors. The electronics of a connected computer detects the different durations of the sound waves in and against the flow direction in the measuring section based on known delay time methods. The strong flow constriction due to the reduction ensures a sufficiently high flow velocity between the two reflectors and largely eliminates asymmetrical flow profiles in the inlet region of the measuring device. A distinctive measuring effect is achieved and the influence of radially disturbed flow profiles is minimized.

As a reducer, a measuring channel ring can be provided, which is either integrated into the measuring channel or can be easily inserted into the measuring channel. The measuring channel ring can be designed in such a way that it reduces the measuring channel uniformly around its circumference and the medium is guided directly through the center of the measuring channel.

The reducer can consist of several, especially two reducer parts, e.g. two measuring channel ring parts. The advantage of such reducer parts is that they allow certain tolerances and lie against the measuring channel inner wall in a corresponding manner. Furthermore, the advantage of two reducer parts is that they can receive e.g. a flow plate, which ensures further optimization of the flow of the medium.

The two reducer parts of a reducer and/or of a measuring channel ring can expediently be identical, so that e.g. only one injection mold is required for manufacturing them. In addition, this substantially facilitates the installation of the reducer and/or the measuring channel ring.

The reducer parts can advantageously be connected, e.g. joined together or screwed together detachably and e.g. can be inserted into the measuring channel together with the aforementioned flow guide plate as one unit. For repair measures the measuring channel ring parts can also be easily detached from one another.

However the reducer parts can also be permanently connected, e.g. glued to one another.

The reducer can advantageously fix a holding plate in place. This holding plate can advantageously be the flow guide plate describe above.

Furthermore, the holding plate can be provided for arranging at least one pair of reflectors.

The holding plate thus performs two functions, namely: firstly the optimization of the flow profile, in that the proportion of spins in the flow is reduced, especially in the inlet region of the measuring channel and secondly the support function for the pair of reflectors.

The holding plate can expediently stretch in the longitudinal direction of the measuring channel, wherein it is arranged diametrically in the measuring channel. Especially in the case of larger diameters having nominal widths of more than 50 mm, the reducer together with the holding plate ensures an acceleration of the flow velocity and also an elimination of disturbing flow profiles.

The reducer can be connected to the holding plate to form one unit, so that this unit can be inserted as a measuring insert from the front and/or from one side into the measuring channel. The reducer and the holding plate together form a unit, so to speak, for flow optimization.

A reducer part described above can comprise, especially on its front side, at least one pin, which engages in a corresponding borehole in the holding plate and/or in the other reducer part. Due to this a stable, easily mountable and redetachable connection is created.

A seal, which balances out tolerances, can be provided between the reducer and the measuring channel inner wall. Furthermore, the seal can clasp around the entire unit, i.e. the reducer and the holding plate arranged thereon so that the stable unit is additionally secured and sealed to the measuring channel inner wall.

At least one, especially two O-rings running circumferentially around the reducer part can be provided as the seal. Two O-rings increase the sealing and optimize the centering of the entire measuring insert in the housing. The reducer and/or the measuring channel ring can comprise circumferential grooves, in which the O-rings are located, so that the latter are stabilized in their position. Furthermore, the O-rings balance out different temperature coefficients between metal parts and plastic parts.

The reducer can comprise at least one groove running essentially in the flow direction or a channel in the region of the ultrasound converter. These grooves create a continuous flow over the converter surfaces adjoining thereto, due to which depositions can almost be eliminated. Since the reducer also causes accumulation zones and swirl zones in its front side region and back side region, wherein said zones can sometimes lead to depositions on the converter surfaces, these grooves are of significant advantage.

The groove or the cleaning channel for preventing contamination and/or locally stable air bubbles, can be arranged on the inner side of the reducer, due to which the sealing O-rings can be attached over the entire outer periphery of the reducer.

However, the groove can also be arranged on the outer side of the reducer and/or the measuring channel ring, where said groove also serves for preventing contamination and/or locally stable air bubbles in the dead zone of the reducer below the converter.

In the last-mentioned embodiment, the O-ring(s) can be located in grooves, which extend up to the housing-side cleaning groove. The grooves for the O-rings can thereby be embodied as annular grooves, into which a single O-ring can be inserted.

It is especially advantageous to arrange and/or design the reducer and the reflectors and/or holding plate and/or reflector holders in such a way relative to one another that the laminar flow of the medium is hardly influenced. Due to this, shadowing effects, thus flow inhomogeneities in the measuring zone and an equipment-characteristic line strongly tapering towards very small flows can be reliably avoided. Using the advantageous constructive variant of the invention, it is possible to expand the measuring range towards very low flow velocities, or alternatively to reduce the pressure drop of the flow meter in the case of identical technical measurement properties by increasing the reducer internal diameter.

E.g. an axially inclined measuring section can be provided as the variant of an embodiment, wherein the inlet-side reflector is lesser inclined towards the axis (longitudinal axis) running in the longitudinal direction than the outlet-side reflector. The inlet-side reflector can be inclined towards the axis (longitudinal axis) of the measuring channel especially in a range of between 35° and 44°, wherein the outlet-side reflector is inclined towards the longitudinal axis in a range of between 46° and 70°. In doing so, the reducer itself does not have to be changed. The measuring section thus runs axially inclined towards the longitudinal axis of the measuring channel. The flow largely follows the curve beyond the reflector surface if the angle of incidence of the inlet-side reflector is reduced to approx. 40% relative to the longitudinal axis and if the flow is not previously deflected upwards by the reflector fixation. The medium can also freely flow around the outlet-side reflector so that the intended self-cleaning effect can unfold optimally.

In another variant of the embodiment, it is also possible to provide a non-centrical reducer whose open inner region is positioned out-of-center in the measuring channel. In the case of the non-centrical reducer, one side of the reducer has a larger thickness, which reduces continuously towards the opposite side. By a corresponding arrangement of the reflectors, the laminar flow can also be deflected into the ultrasound measuring section more effectively.

In the last variant of the embodiment, the measuring section expediently and essentially runs centrically in the open inner region of the reducer.

The reflectors and/or the reflector holders can be easily punched out of the holding plate, at least in certain regions, and be bent accordingly. If necessary, the reflectors can be inclined from the plane of the holding plate or from the plane of the reflector holders only towards the center of the open inner region of the reducer so that no previous deflection of the flow toward another direction takes place, wherein said deflection sometimes leads to flow inhomogeneities.

Furthermore, an asymmetrical reducer can be provided whose opposite border regions (and/or incoming flow regions) each continuously change in their inclination in mutual opposition. The thickness of the reducer thereby remains constant. The advantage of this variant of the embodiment is that two identical reducer half shells and/or measuring channel ring parts can be used.

In another variant of the embodiment, an oblique reducer can be provided, whose wall thickness changes continuously over the width of the reducer and increases in the cross-section of the reducer on one side and reduces on the opposite side. Here, a slight deflection of the holding plate upwards in the region of the reflectors can be provided in order to bring about an effective flow guidance. In this case also two identical reducer half shells can be used.

As an alternative to the device comprising two reducer parts described above, the reducer can be embodied as a single part and the holding plate can be embodied as a two-part component. In this case the two holding plate parts can be inserted laterally e.g. into a corresponding groove of the measuring channel ring.

The reducer and/or the measuring channel ring can be made out of plastic and thus can be manufactured as a mass product in a cost-effective manner in the injection molding process.

According to the invention it is possible to provide in the measuring channel at least one flow guide plate, which serves as the holding plate for the pair of reflectors and stretches in the longitudinal direction of the measuring channel. This variant of the embodiment is already described above in connection with the reducer. The holding plate in the function of a guide plate minimizes the influence of disturbing spin components in the water flow, said spin components appearing massively especially behind the so-called pipe elbows.

The length of the holding plate essentially corresponds to the length of the measuring channel, so that a corresponding flow deflection is created in the inlet channel and the outlet channel.

The holding plate can engage, at least in certain regions and at least on an end region on its border side, in grooves on the measuring channel inner wall for a stable hold, especially in the case of a flowing medium. For this purpose the holding plate can be broader in its front-sided end regions so that this broadened extension serves as a plate holder and can engage in the respective grooves in the housing inner wall, especially in the flange region.

However, the holding plate can also be connected to the measuring channel inner wall by means of holding devices arranged especially on its corner regions. The holding plate itself thus need not be embodied to be broadened in its end regions. Furthermore, the holding devices can consist of such a material that they dampen harmful vibrations.

The holding devices can be embodied as locking pins, which are arranged on the longitudinal side on the respective border region of the holding plate. The locking pins can be made of plastic. They serve for stabilizing the holding plate and prevent harmful vibrations, as described above. Furthermore, they avoid a direct contact between the housing (mostly made of brass) and the holding plate (e.g. made of stainless steel) for preventing contact corrosion. The distance of the housing from the holding plate can be additionally increased to a few millimeters by means of the holding devices or locking pins.

The holding plate stretches expediently diametrically through the measuring channel, so that the same flow rates are present above and below the holding plate. The holding plate can be connected to a reducer and/or a measuring channel ring arranged in the measuring channel so that it forms a unit therewith, as described above.

The holding plate can comprise reflector holders for the reflectors, so that the reflectors can be arranged in a stable manner.

The reflector holders can be advantageously shaped so as to optimize the flow in order to firstly keep the pressure drop in this region low and secondly in order to guide the flow specifically into the ultrasound measuring zone with the side-effect that the self-cleaning of the reflectors is promoted.

In addition, the surfaces of the ultrasound converters and/or of the reflectors and/or of the reflector holders can be non-stick coated. Such non-stick coatings are characterized by a low surface energy. So-called adamantine amorphous carbon layers, which are applied using chemical vapor deposition and are absolute in contrast to the known SolGel process and permanently durable as compared to aqueous solutions, have proved to be useful.

The reflector holders can be detachably connected to the holding plate so that the latter can be quickly replaced in the event of damage. The reflector holders can be two-part, wherein a first reflector holder part comprises pins, which penetrate in the boreholes of the holding plate and engage in corresponding boreholes of a second reducer holder positioned on the other side of the holding plate. Before joining the two reflector holder parts together, the reflector is inserted on the front side on one reflector holder part and secured therein by joining the two parts together. The reflector holders can be chamfered on their front-side surfaces, which are turned towards one another so that the reflectors accordingly lie obliquely so as to enable the intended U-ray guidance.

The reflectors can each be arranged in a receptacle of the reflector holder. The depth of the receptacle can advantageously correspond to the thickness of the reflectors so that the front side of the reflector holders is flush with the surface of the reflectors and a swirl zone is prevented.

Additionally or alternatively thereto, the reflectors can be covered, in that they are overlapped e.g. by a wall region of the reflector holder. By using a suitable material, especially a plastic material, for the cover and/or the wall region of the reflector holder and/or the entire reflector holder, wherein the sound-relevant characteristics (impedance) of said material differ to the least extent possible from those of water (e.g. PEEK [Polyetherketone], PES [Polyethersulfone], PVDF [Polyvinylidene fluoride], EPDM [Ethylene-propylene rubber], Viton, in each case without or with a very small portion of glass fiber), the reflection properties are not influenced negatively, in comparison with the open reflector. The positioning of the reflectors is in this case easy to carry out since the reflectors have to be inserted only in corresponding recesses of the reflector holders. An additional fixing of the reflectors is not necessary.

In an alternative variant of the embodiment, the reflectors and/or the reflector holders can be components of the holding plate, wherein they are punched out, at least in certain places, from the holding plate and are bent upwards. This variant is extremely simple and especially cost-effective. Reflector holders are actually no longer necessary since the punched out regions of the holding plate themselves serve as reflectors.

The reflectors can be oval in shape and twisted by 45°, so that they can transmit the ultrasound in the form of the U-ray principle from ultrasound converter to ultrasound converter. The reflector holders or the reflectors can be connected to the holding plate using bars, which are so stable that they hold the reflectors permanently in the bent position.

In another inventive variant of the embodiment, at least two measuring sections each comprising at least one pair of reflectors and one ultrasound converter is provided. Due to this it is possible to perform measurements in different regions of the measuring channel, thus attaining higher measurement accuracy. In the case of very large nominal widths e.g. of over 50 mm of the measuring channel, the integration of several measuring sections is advantageous in order to attain high measurement accuracy. Thus, especially in the case of nominal widths that are larger than 100 mm a particularly good measurement accuracy is attained, said measurement accuracy being largely independent of the flow profile. The contacts of the pairs of converters can all be jointly connected in series to the computer (without additional electronic circuit). Instead of the otherwise usual mathematic average determination using the computer software, the fact that out-of-phase pressure vibrations on the converter surface add up physically is exploited. The average is determined immediately from the measurement. The two reflectors of a pair of reflectors can determine a measuring section so that the actual measurement takes place only between the two reflectors. The ultrasound converters thereby serve only for emitting and/or receiving ultrasound signals.

The ultrasound can be guided in a U-shape as in the case of the above variants of the embodiment from one ultrasound converter via the reflectors to the other ultrasound converter. The reflectors and the measuring section therewith can thus be placed optimally in the flowing medium.

Furthermore, the advantages of the two-channel technology or multi-channel technology are that the physical average determination brings about extensive elimination of the secondary flow-induced error, which occurs due to temperature-dependent convection flow. Both in the case of very small flows as well as in the case of high medium temperatures, good and reproducible measurement accuracy is attained, which is largely independent of the installation position of the measuring device.

The different measuring sections can be separated from one another at least in certain regions by a holding plate on which the reflectors are arranged. The holding plate can advantageously be the holding plate described in the other embodiments.

The holding plate can thus simultaneously serve as a reflector support. In doing so the holding plate can be embodied with the reflectors and/or reflector holders mirror-symmetrically so that the same conditions prevail on both sides of the holding plate.

At least one interacting pair of reflectors and/or pair of reflector holders can be expediently arranged on each side of the holding plate. For this purpose, for example, two main supports supporting four directly opposite reflector holders each can be positioned on the holding plate directly opposite to one another. An effective ultrasonic transmission of the measuring channel is thus possible.

The holding plate can be open in a region between the reflectors of one pair so that the reflectors and/or the reflector holders are easily mountable.

At the center of the measuring channel, a displacement member can also be arranged, which, just like the measuring channel ring, forces the flow directly into the ultrasound measuring path. The flow inside the ultrasound measuring sections can be homogenized specifically in a manner so as to be able to positively influence measurement accuracy and flow invariance.

Also in this variant of the embodiment comprising several measuring sections, the reducer and/or the measuring channel ring described above can be advantageously provided, which leads to the flow optimization described above.

Figure 2:
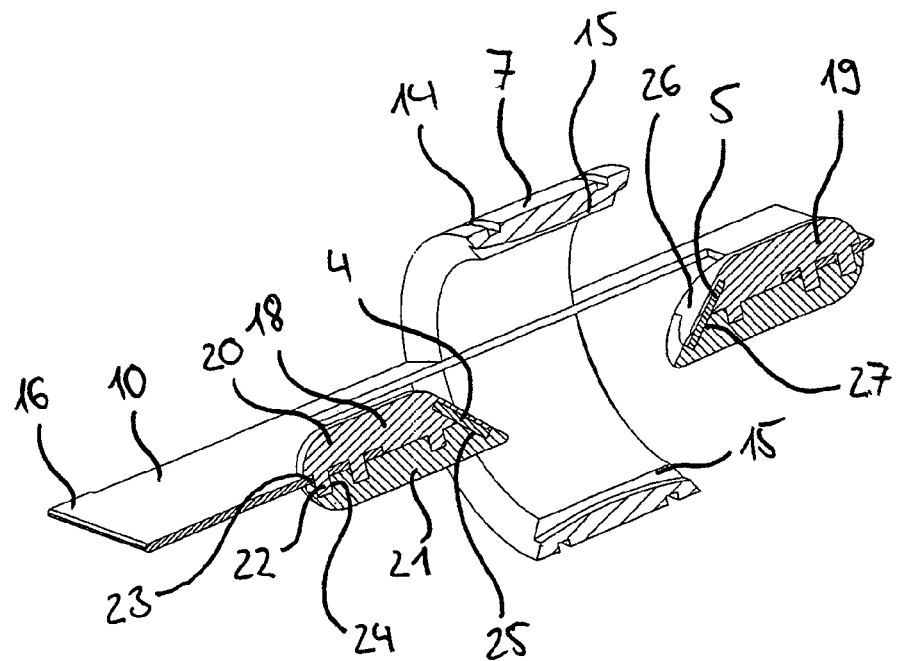
Figure 3:
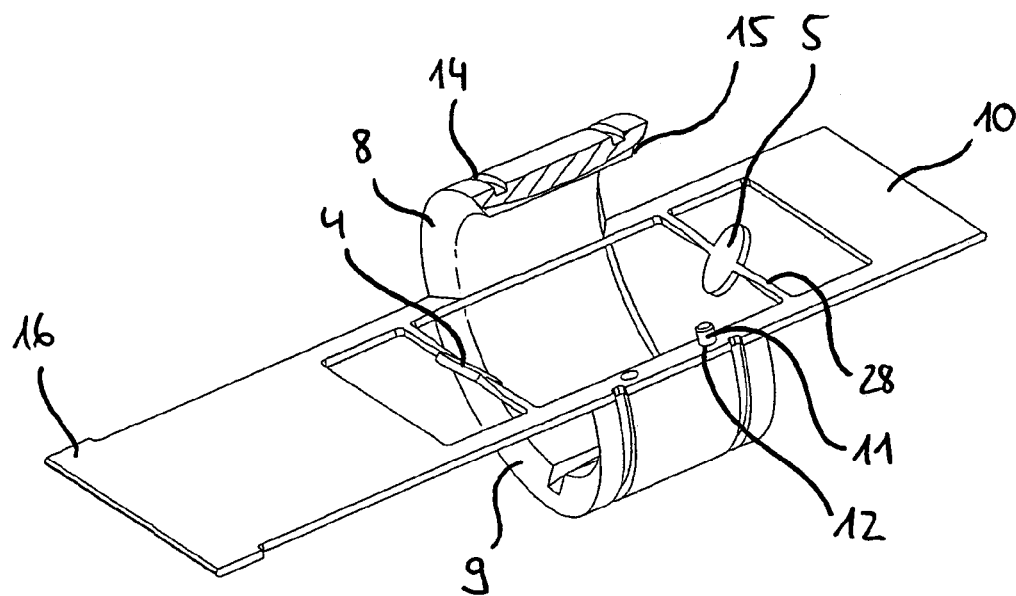
Figure 4:
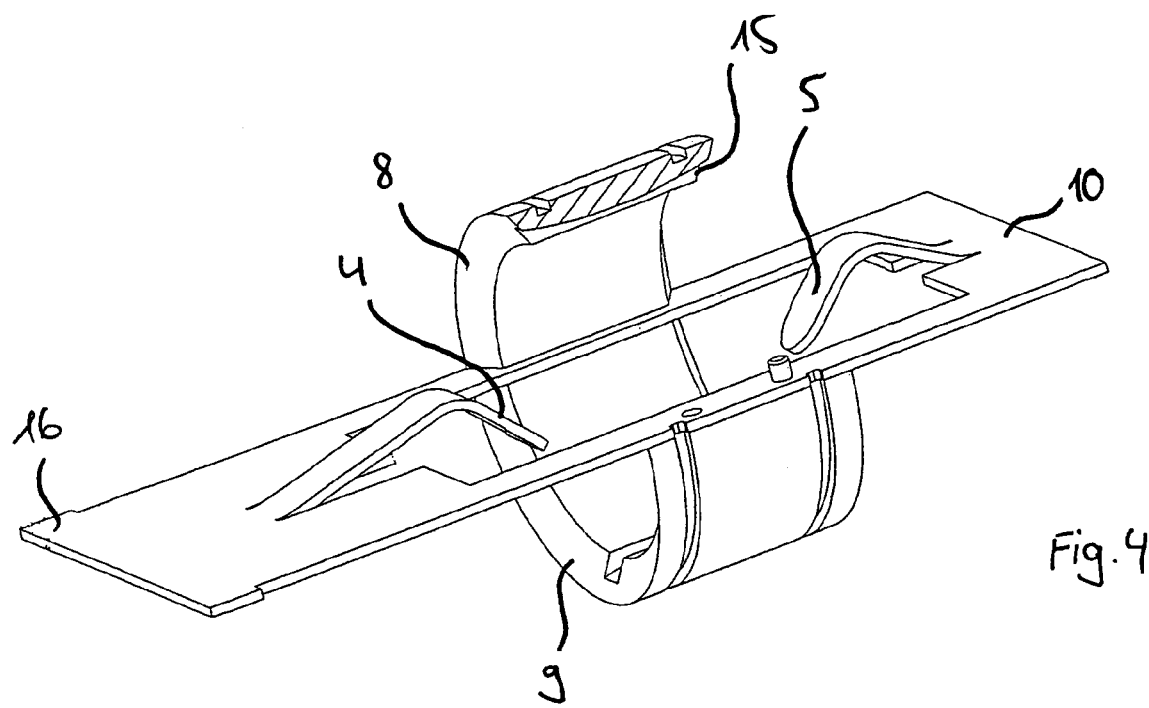
Figure 5:
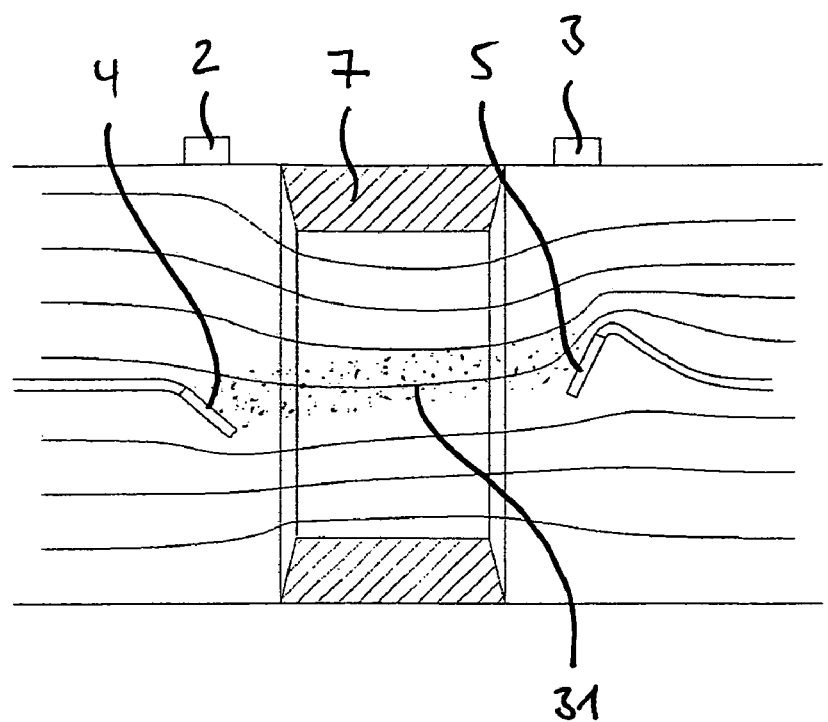
Figure 6:
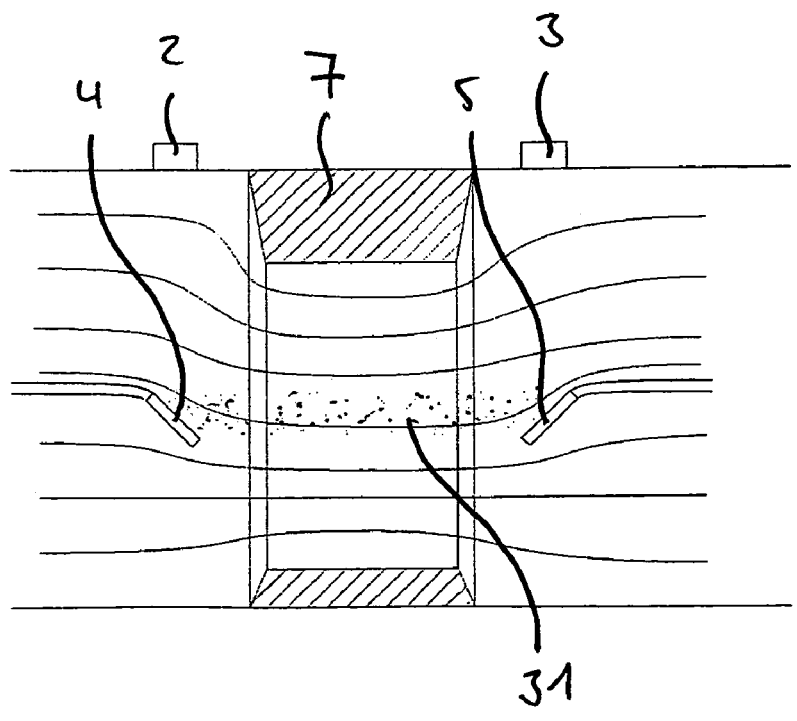
Figure 7:
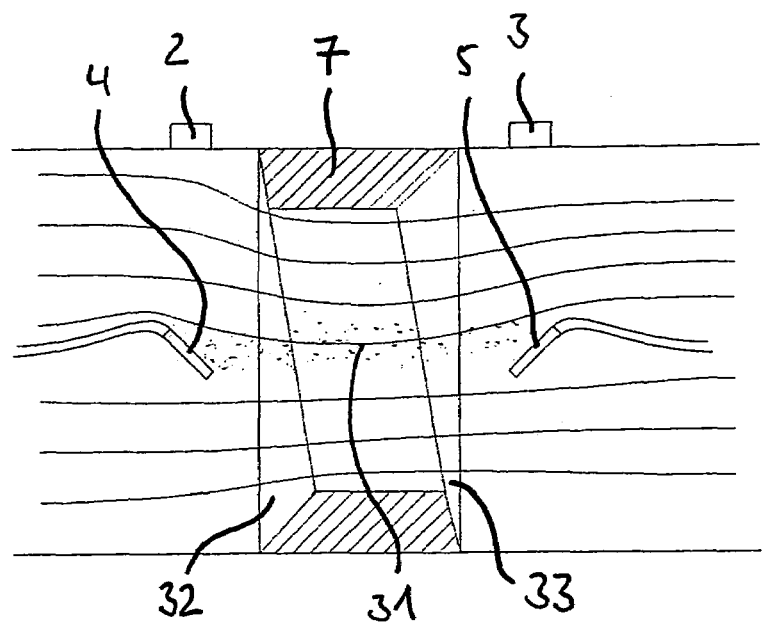
Figure 8:
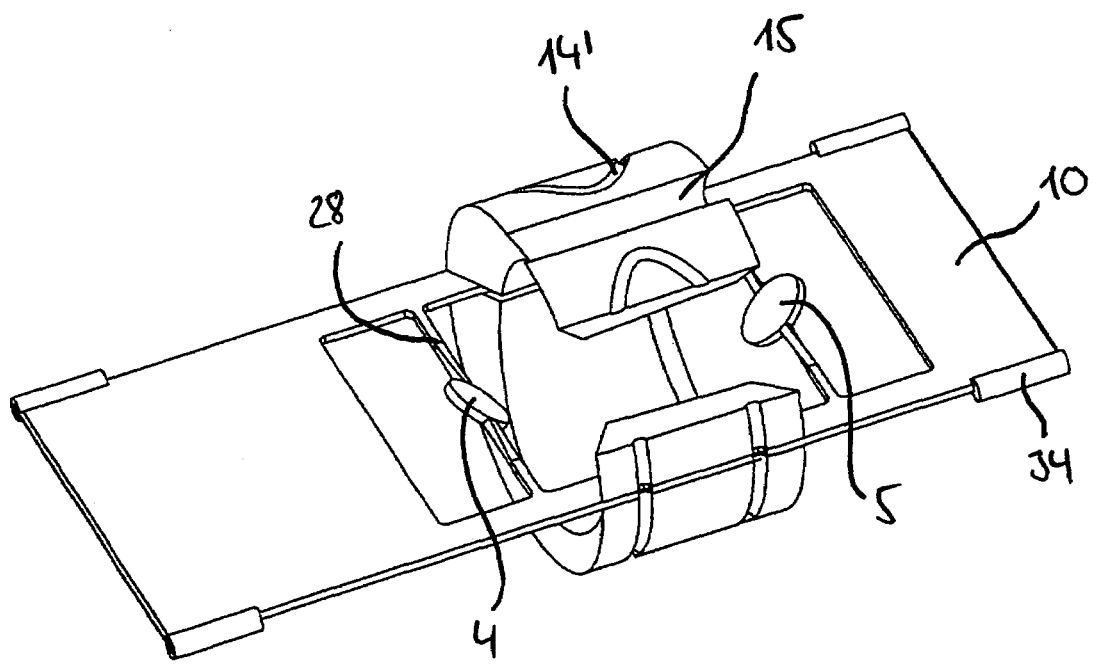
Figure 9:
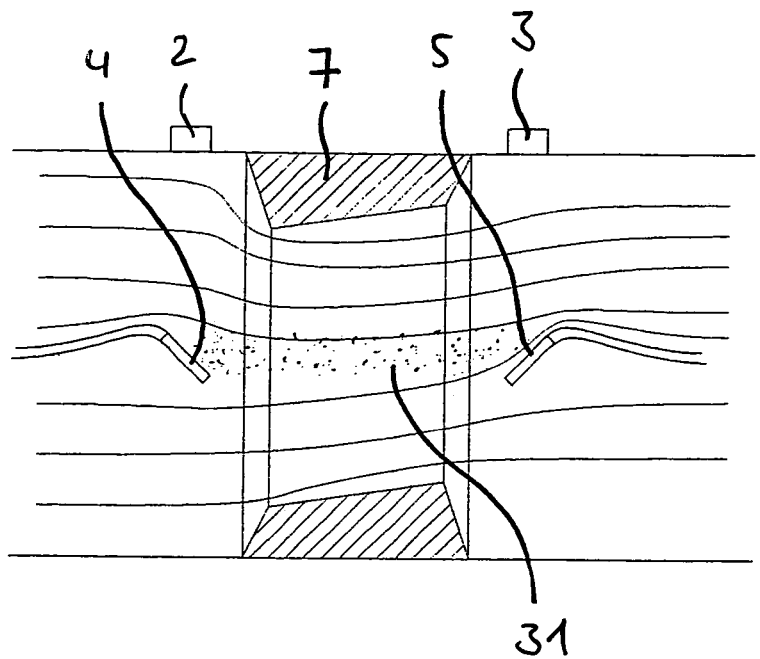
Figure 10:
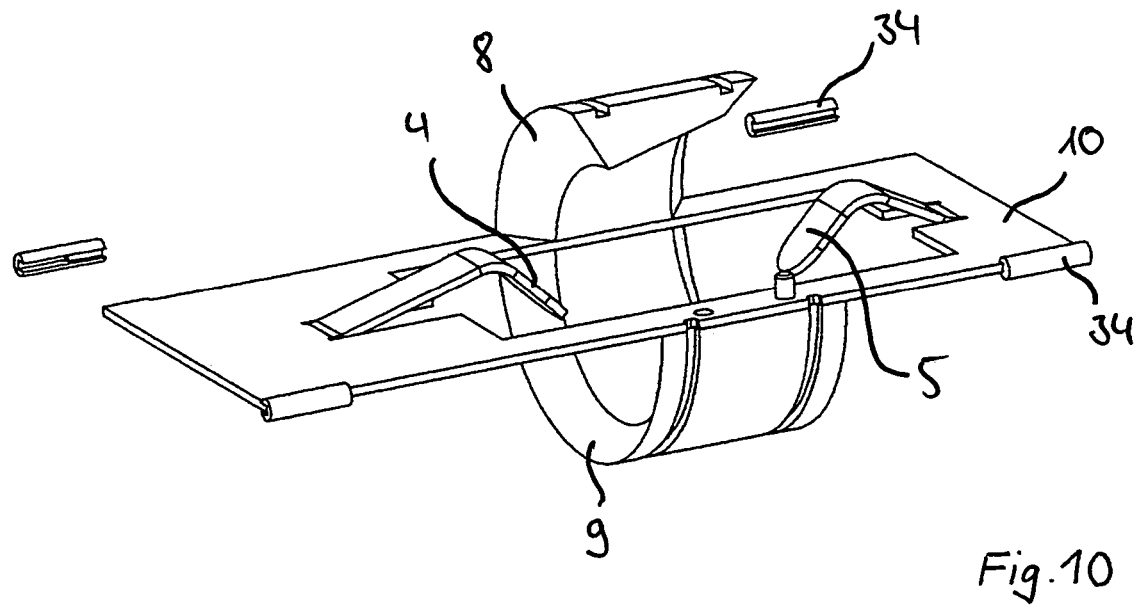
Figure 11:
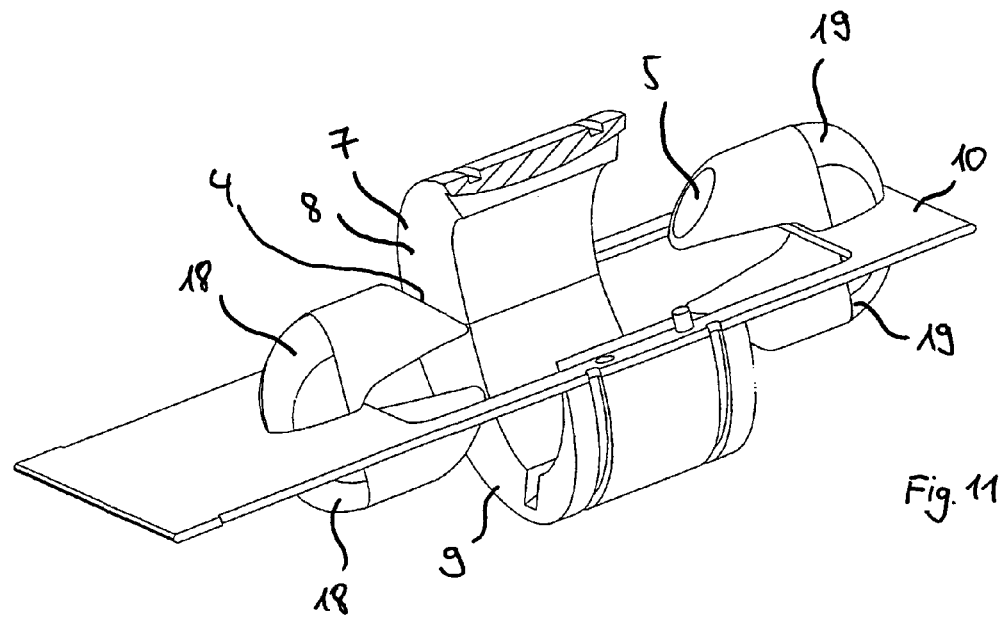
Figure 12:
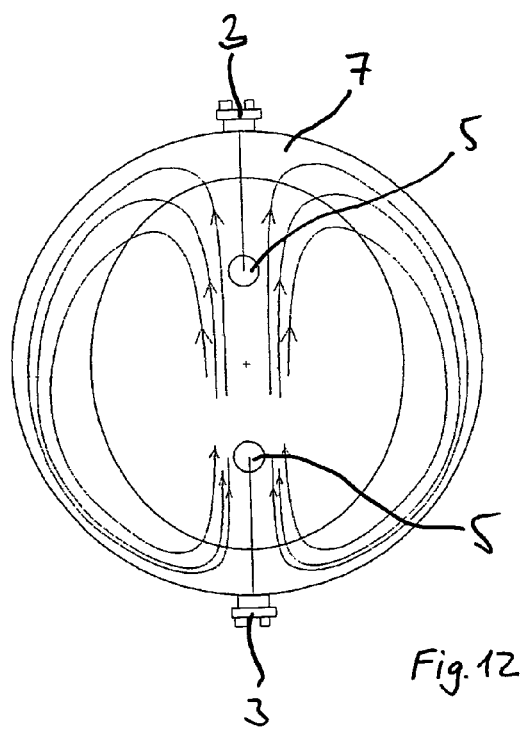
Figure 13:
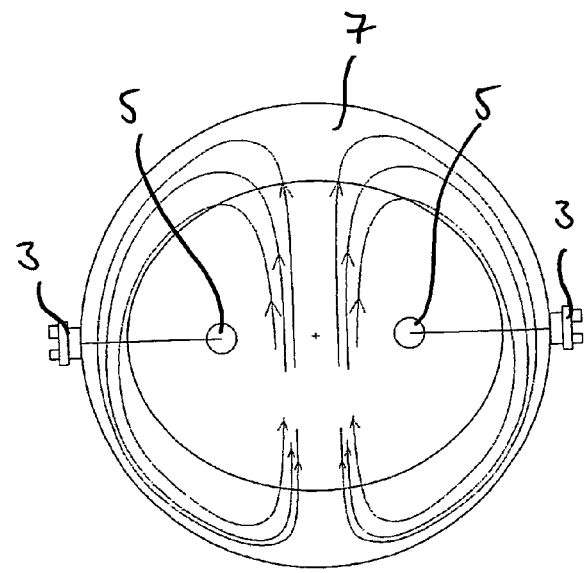
Figure 14:
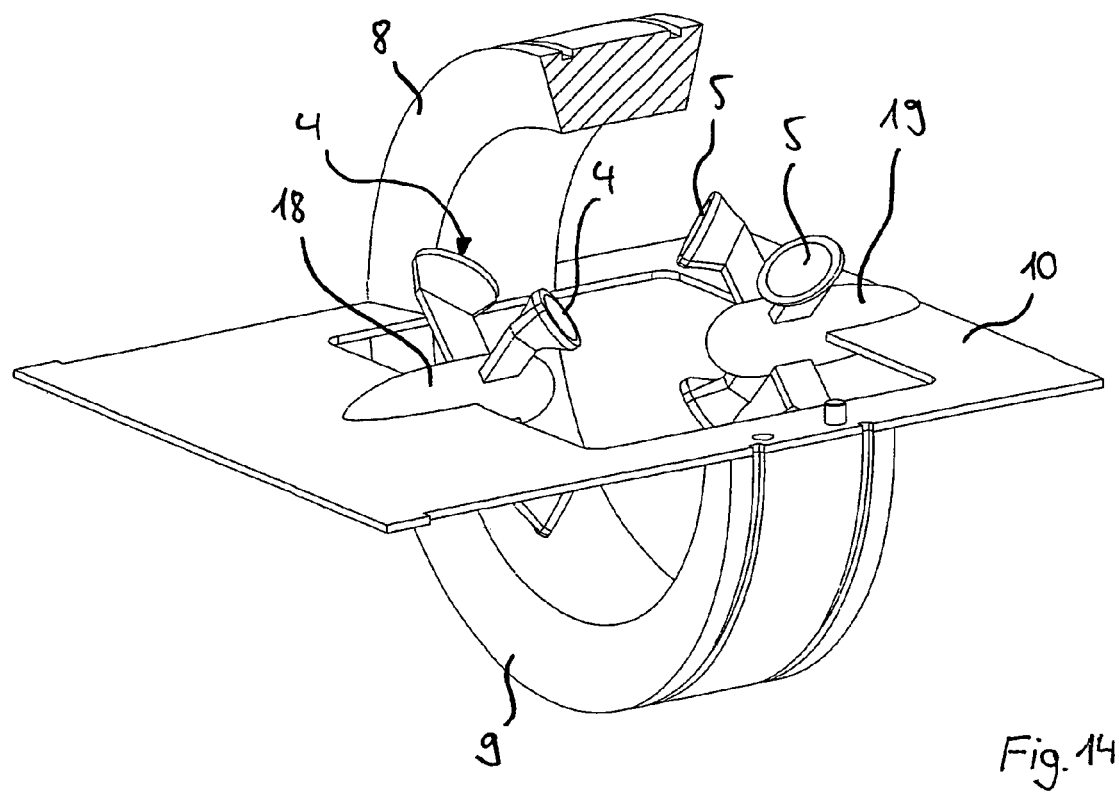
Figure 15:
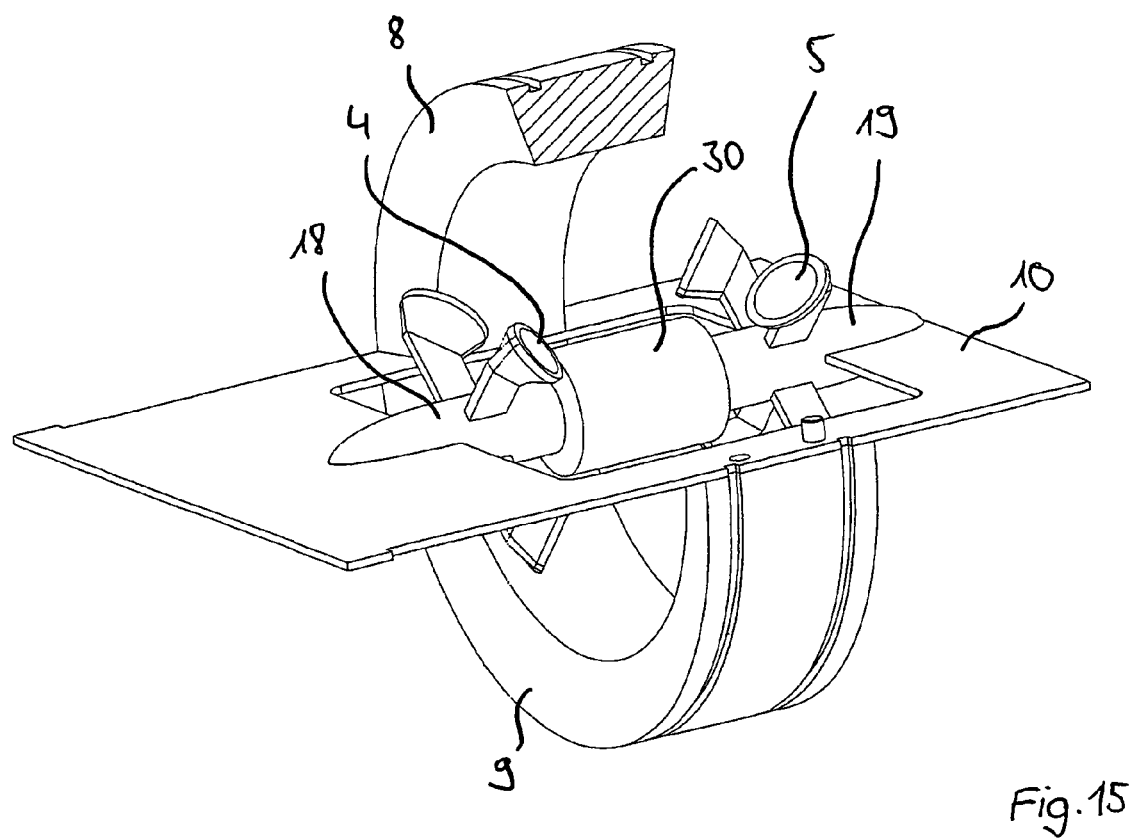
Figure 16:
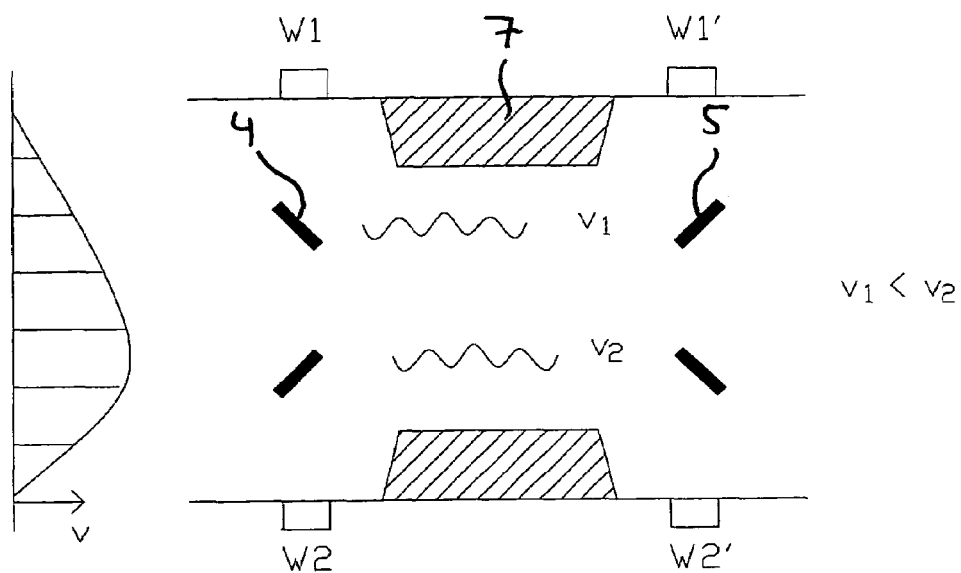
Figure 17:
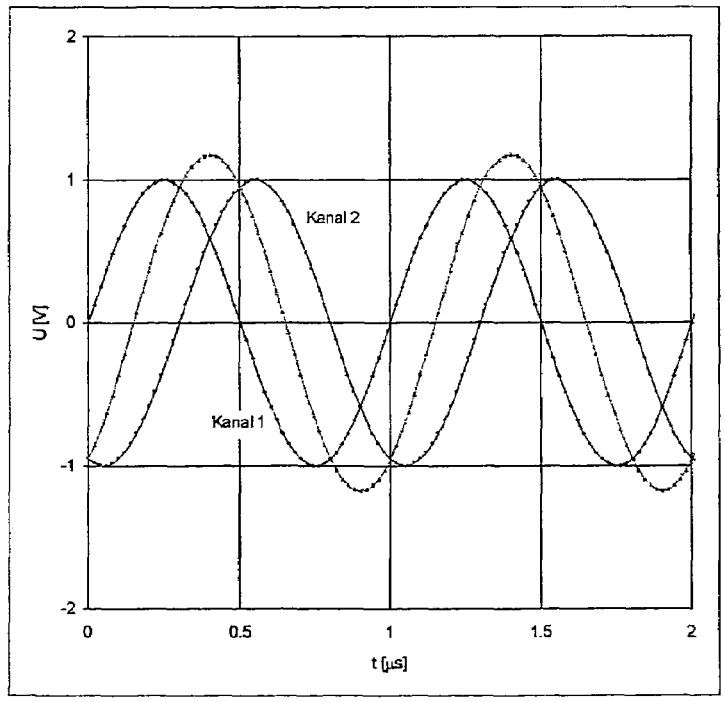

The invention is explained in more detail on the basis of embodiments in the figures, of which:

FIG. 1: is a perspective, sectional illustration of an inventive flow meter having a measuring insert comprising a measuring channel ring, holding plate and reflectors;

FIG. 2-FIG. 4: are perspective, at least partially sectional illustrations of alternative measuring inserts;

FIG. 5: illustrates a cross-section of a measuring channel region having an axially inclined measuring section;

FIG. 6: illustrates the cross-section of a measuring channel region having a non-centrical reducer;

FIG. 7: illustrates the cross-section of a measuring channel region having an asymmetrical reducer;

FIG. 8: is a respective, at least partly sectional illustration of a measuring insert having an asymmetrical reducer;

FIG. 9: is the cross-section of a measuring channel region having an oblique reducer;

FIG. 10: is a perspective, at least partially sectional illustration of the measuring insert shown in FIG. 9;

FIG. 11: is a perspective, at least partly sectional illustration of a measuring insert having two measuring sections;

FIG. 12: is a cross-sectional illustration of a measuring channel having two measuring sections;

FIG. 13: is a cross-sectional illustration of the measuring channel shown in FIG. 13, said measuring channel being rotated by 90°;

FIGS. 14 and 15: are perspective, at least partly sectional illustrations of measuring inserts having four measuring sections;

FIG. 16: is a schematic diagram of the physical addition and also FIG. 17: illustrates gradients of two measuring channels and their addition.

FIG. 1 illustrates a flow meter for liquid or gaseous media, said flow meter comprising a measuring channel 1 through which a medium flows, an inlet channel and also an outlet channel and a pair of ultrasound converters 2, 3 for emitting and/or receiving ultrasound signals, wherein a pair of reflectors 4, 5 is provided in the measuring channel 1 for guiding an ultrasound signal from one ultrasound converter 2 to the other ultrasound converter 3. The diameter of the measuring channel 1 is reduced in certain regions, namely in the region of the measuring section determined by the two reflectors 4, 5 for the flow guidance of the medium. The reducer 7 is formed by a measuring channel insert, which is arranged on the measuring channel inner wall 6 and which simultaneously serves as a holder or a fixation for additional functional parts. A measuring channel ring is provided as a reducer 7.

The reducer 7 ensures the injection of the inflowing liquid and thus an acceleration of the flow between the two reflectors 4, 5 where the measuring zone for measuring the flow velocity is located. Due to this, even largely asymmetrical flow profiles are eliminated so that a more accurate measurement can be performed. Production costs can be reduced in that the measuring channel insert serves simultaneously as a holder or fixation for additional functional parts.

As can be seen in the FIGS. 3, 4, 8, 10, 11, 14 and 15, the measuring channel ring 7 consists of two measuring channel ring parts 8, 9, which enclose a holding plate 10 in-between. The measuring channel ring 7 together with the holding plate 10 forms a measuring insert, which can be inserted as one unit from the front into the measuring channel 1.

The measuring channel ring parts 8, 9 are embodied identically; this is advantageous both for their production as well as for their installation.

The measuring channel ring parts 8, 9 can be joined together and can in this manner be easily mounted and dismounted for repair measures.

The holding plate 10 arranged in the measuring channel 1 serves, inter alia, as a holder for the pair of reflectors 4, 5. The holding plate 10 is thus simultaneously a support of the measuring channel ring parts 8, 9 and also of the reflectors 4, 5.

The holding plate 10 stretches in the longitudinal direction of the measuring channel 1 and thus simultaneously represents a flow guide plate with its surface.

A measuring channel ring part 8 comprises at its front side a pin 11, which engages in a corresponding borehole 12 in the holding plate 10 and also in another measuring channel ring part 9. A stable unit is thus produced.

Furthermore, a seal in the form of two circumferential O-rings 13 is provided between the measuring channel ring 7 and the measuring channel inner wall 6. In addition to the sealing function, the O-rings 13 center the entire measuring insert in the housing and balance out different temperature coefficients between the metal housing and the measuring channel ring 7 made of plastic.

The measuring channel ring 7 comprises circumferential grooves 14 in which the O-rings 13 are located securely.

For protecting the ultrasound converters 2, 3 from depositions in the accumulation zones and swirl zones, the measuring channel ring 7 comprises a groove 15, which runs in the flow direction and which creates a continuous flow over the converter surfaces.

In the embodiments shown in FIGS. 3, 4 and 11, the groove 15 is arranged on the measuring channel inner wall 6. However, the groove 15 can also be arranged on the outer side of the reducer as illustrated in FIG. 8. Here the groove 15 also provides protection from contamination and/or locally stable air bubbles in the dead zone of the reducer below or above the ultrasound converter 2, 3. The O-ring 13 arranged in this embodiment lies in grooves 14, which reach up to the groove 15. The grooves 14 are thereby embodied as annular grooves 14, which run only up to the groove 15 from both the sides.

In the variant illustrated in FIG. 4, the reflectors 4, 5 protrude into the section of the holding plate 10 like elongated metal tongues. By the exact curvature into the shape illustrated, both the ultrasound guidance as well as the intended, adjacent flow guidance is achieved using the inlet-side reflector, since especially in the case of a laminar flow, the latter does not depart at the tip of the plate and thus the negative effects of the swirl formation in this position can be prevented.

In the FIGS. 5 to 10, in particular, the reducer and the reflectors 4, 5 and/or the holding plate 10 are arranged and/or designed relative to one another in such a way that the laminar flow of the medium is hardly influenced.

In FIG. 5, the measuring section 31, which is illustrated by a dotted region, is inclined axially toward the longitudinal axis of the measuring channel 1. The inlet-side reflector 4 is inclined by approx. 40° towards the longitudinal axis of the measuring channel 1, wherein the outlet-side reflector 5 is inclined by approx. 65° towards the longitudinal axis of the measuring channel 1. Due to this, the flow largely follows the curvature beyond the reflector surface and possible flow inhomogeneities are prevented. Furthermore, the thus largely permanent laminar flow ensures that the reflectors 4, 5 are constantly clean.

In FIG. 6 a non-centrical reducer is provided, whose open inner region is positioned out-of-center in the measuring channel 1. The reflectors 4, 5 and/or the regions on which the reflectors 4, 5 are arranged are inclined downwards so that the laminar flow is maintained. The reflectors 4, 5 are thereby arranged in such a way that the measuring section 31 runs essentially centrically in the open inner region of the reducer.

The reflectors 4, 5 and/or the reflector holders 18, 19 can be punched, at least in certain regions, out of the holding pate 10 and bent, as a result of which no separate reflectors or reflector holders have to be used.

The reflectors 4, 5 are inclined from the plane of the holding plate 10 or from the plane of the reflector holders 18, 19 only towards the center of the open inner region of the reducer, so that flow irregularities are prevented.

In the FIGS. 7 and 8, an asymmetrical reducer is provided, whose opposite border regions 32, 33 (and/or incoming flow regions) each continuously change in their inclination (and thus also in their width) in mutual opposition. The thickness of the measuring channel ring 7 remains constant over the entire periphery. This arrangement of the reflectors 4, 5 and also the special design of the measuring channel ring 7 ensure an extensive retention of the laminar flow. Furthermore, the advantage of this variant of the embodiment is that two identical measuring channel ring parts 8 can be used.

In the embodiment illustrated in FIGS. 9 and 10, an oblique reducer is provided, whose wall thickness changes continuously over the width of the reducer, wherein the wall thickness increases in the cross-section of the reducer on one side and correspondingly reduces on the opposite side. As illustrated in FIG. 9, here also the laminar flow of the medium is retained.

It is also possible for the measuring channel ring 7 to be one-part and thereby e.g. the holding plate 10 to be two-part so that the two parts of the holding plate 10 can be e.g. inserted on the measuring channel ring 7. However, this variant of the embodiment is not illustrated in the figures.

The reducer and/or the measuring channel ring 7 are made of plastic and can thus be mass-produced relatively cheaply using the injection-molding process.

As mentioned above, the holding plate 10 simultaneously serves as the flow guide plate and as the support for the pair of reflectors 4, 5 and stretches in the longitudinal direction of the measuring channel 1. The holding plate 10 reduces especially spin portions particularly in the inlet region of the measuring channel 1.

In order to create a corresponding flow guidance in the entire measuring channel 1, the length of the holding plate 10 essentially corresponds to the length of the measuring channel 1.

The holding plate 10 is embodied to be broadened in one end region in the form of holding regions 16. The holding regions 16 engage in the grooves 17 of the measuring channel inner wall 6, due to which the holding plate 10 is centered in the axial and the radial direction.

However, the holding plate 10 can also be connected to the measuring channel inner wall 6 by means of holding devices which are arranged on its corner regions and which are embodied in the FIGS. 8 and 10 as locking pins 34. The locking pins 34 are thereby arranged on their longitudinal side on the respective border region of the holding plate 10. The locking pins 34 can thereby be located in corresponding grooves 17 on the measuring channel inner wall 6. The locking pins 34 stabilize the holding plate 10 and prevent harmful vibrations of the holding plate 10. Furthermore, the locking pins 34 prevent a direct contact of the housing of the measuring channel, said housing being mostly made of brass, and the holding plate 10, which is mostly made of stainless steel and thus prevents contact corrosion.

The holding plate 10 stretches diametrically through the measuring channel 1, so that the flow guidance is brought about over the entire width of the measuring channel 1 and the disturbing flow portions are displaced accordingly.

As mentioned above, the holding plate 10 is connected to a measuring channel ring 7 arranged in the measuring channel 1 and forms with said measuring channel ring a measuring insert for the flow guidance.

In the embodiments illustrated in FIGS. 1, 2 and 5 to 7, the holding plate 10 comprises reflector holders 18, 19 for the reflectors 4, 5. The advantage of the reflector holders 18, 19 is that they can be shaped in a manner that optimizes the flow. The outer surfaces of the reflector holders 18, 19 are thereby rounded off accordingly (see FIGS. 1, 2 and 5 to 7). The flow-optimized shape of the reflector holders 18, 19 firstly keeps the pressure drop on these regions low and secondly guides the flow specifically into the ultrasound measuring zone with the side-effect that the self-cleaning of the reflectors 4, 5 is promoted.

Additionally or alternatively thereto, the surfaces of the ultrasound converters 2, 3 and/or the reflectors 4, 5 and/or the reflector holders 18, 19 can be non-stick coated.

The reflector holders 18, 19 can be detachably connected to the holding plate 10; this is advantageous for the purpose of mounting and dismounting.

In the variants of the embodiment illustrated in FIGS. 1 and 2, the reflector holders 18, 19 are each two-part, wherein a first reflector holder part 20 comprises pins 22, which penetrate in the boreholes 23 of the holding plate 10 and engage in corresponding boreholes 24 of the reflector holder part 21 positioned on the other side of the holding plate 10. The reflectors 4, 5 are previously inserted in the corresponding receptacles 25, 27 of the reflector holders 18, 19 and are fixed therein by means of the connection of the reflector holder parts 20, 21.

In the variant of the embodiment illustrated in FIG. 2, the reflectors 4, 5 are covered by a wall region 26 of the respective reflector holder 18 and/or 19. The reflector holders 18, 19 are made of a suitable plastic material, whose sound-relevant characteristics are similar to those of water, so that the reflection properties of the thus covered reflectors 4, 5 are not negatively affected. In this manner, the constructive expenditure can be strongly reduced, since the reflectors 4, 5 have to be inserted only into the corresponding receptacles 27, without the requirement of an additional fixing.

In the embodiments of the measuring inserts illustrated in FIGS. 3, 4, 8 and 10, the reflectors 4, 5 are parts of the holding plate 10 and are punched therefrom and bent upwards and/or downwards. The reflectors 4, 5 are connected in some cases to the holding plate 10 using bars 28. These variants of the embodiment are especially cheap.

In the following description reference is made to FIGS. 11 to 15. In the measuring inserts illustrated there, at least two measuring sections each comprising a pair of reflectors 4, 5 and a pair of ultrasound converters 2, 3 are provided. The two reflectors 4, 5 of a pair of reflectors determine a measuring section. This multitude of measuring sections is expedient if the measuring channel 1 has a large nominal width (especially larger than 100 mm), since in the case of large measuring channels 1, the flow velocity is not constant all-over. The contacts of the pairs of ultrasound converters are all jointly connected in parallel to the computer 29, wherein out-of-phase pressure vibrations on the converter surface add up physically.

Using this arrangement, a large converter is divided so to speak in two or more parts and the separated mechanical—and thus also electrical connection—is compensated in that the divided converters are electrically connected in parallel. For the contacted electronic amplifying circuit, it is then completely immaterial as to whether a large converter or two or more converters are connected. The relevant electrical characteristics (impedance, ohmic resistance, capacititance and inductance) do not change, as long as some constructive specifics are taken into account.

For explaining the physical addition in more detail, reference is made to the FIGS. 16 and 17. The different flow velocities v1 and v2 in the measuring channels 1 create delay times in the measuring sections, i.e. the period of the measuring channel 1 reaches the receiver converter W1' later than the period of the measuring channel 2. The mechanical excitation of the ultrasound converter results from the sum of these two curves, so that the exact determined phase displacement is provided to the evaluation electronics as the electrical converter signal. Should the two signal amplitudes a1 and a2 differ from one another (see equations for FIG. 17), the exact average is calculated using a small difference.

The ultrasound is guided in the case of every single measuring channel in a U-shape from one ultrasound converter 2 via the reflectors 4, 5 to the other ultrasound converter 3, so that the same conditions prevail in every measuring section.

Additional advantages of the two-channel technology and/or multi-channel technology are depicted in the FIGS. 12 and 13. By cooling the medium in a space located in the proximity of the housing, convection flows develop in the case of large volume flow meters. The higher the temperature difference between the medium and the surrounding ambient air, the more distinct are the resulting flows—even along the ultrasound measuring direction. The flows are indicated in the FIGS. 12 and 13 using arrows. As a consequence of the opposing measuring direction at the top and/or at the bottom in the measuring channel 1, the physical average determination brings about an extensive elimination of the secondary flow-induced error, i.e. the error, which is caused by the convection flow. This applies both in the case of the flow measurement under laminar flow conditions as well as if the flow is zero. Should the two-channel flow meter rotated by 90° be guided into the pipeline (FIG. 13), erroneous measurements cannot be expected inspite of convection, since the flow sector and the ultrasound measuring direction are perpendicular to one another. Even in the case of very small flows and high medium temperatures, good and reproducible measurement accuracy is attained, largely independently of the installation position of the measuring device.

The cross-section of the measuring device in the FIGS. 12 and 13 is oval due to the reducer. This proves to be advantageous for the two measuring sections.

A multitude of reflectors 4, 5 can be arranged on the holding plate 10. The holding plate 10 can thereby correspond to the holding plates 10 described above and can also contribute to the flow guidance together with the reducer.

The holding plate 10 is embodied together with the reflector holders 18, 19 mirror-symmetrically so that the same conditions for an exact measurement prevail in the upper and the lower region of the measuring channel 1. At least one pair of reflectors 18, 19 is thereby arranged on every side of the holding plate 10. FIG. 5 illustrates a variant of the measuring insert comprising two parallelly arranged ultrasound measuring paths. The pairs of converters (not illustrated here) arranged at the top and at the bottom together with the reflectors 4, 5 form two ultrasound measuring sections, which are completely independent of one another. Due to the parallel connection of the inlet-side ultrasound converter 2 and/or the outlet-side ultrasound converter 3, a physical average determination is possible without having to change the computer circuit in comparison with the single channel types.

The version illustrated in the FIGS. 14 and 15 is especially suitable for nominal widths greater than 200 mm. These arrangements can also be used for smaller nominal widths, if an especially high measurement accuracy is desired particularly in the case of strongly asymmetrical flow profiles. The variants show four ultrasound measuring paths. A total of eight ultrasound converters 2, 3 and eight reflectors 4, 5 are used. Though the geometry of the measuring channel ring is circular here, it can also have e.g. the contour of a four-leaved clover with the ultrasound converters 2, 3 in the leaf centers.

The difference between the variants shown in the FIGS. 14 and 15 is that the holding plate 10 in FIG. 14 is open in a region between the reflectors 4, 5 of one pair. In FIG. 15, at the center of the measuring channel 1, a displacement member 30 is arranged which ensures a more forceful flow guidance in the pipe center. The flow inside the ultrasound measuring sections can be homogenized specifically in a manner that enables the positive influence of measurement accuracy and flow invariance.

LIST OF REFERENCE NUMERALS

1. Measuring channel
2. Ultrasound converter
3. Ultrasound converter
4. Reflector
5. Reflector
6. Measuring channel inner wall
7. Reducer, measuring channel ring
8. Reducer part, Measuring channel ring part
9. Reducer part, Measuring channel ring part
10. Holding plate
11. Pin
12. Borehole
13. O-ring
14. Groove
14'. Annular groove
15. Groove
16. Holding region 17. Groove
18. Reflector holder
19. Reflector holder
20. First reflector holder part
21. Second reflector holder part
22. Pin
23. Borehole
24. Borehole
25. Receptacle
26. Wall region
27. Receptacle
28. Bar
29. Computer
30. Displacement member
31. Measuring section
32. Border region
33. Border region
34. Locking pins

The invention claimed is:

1. Flow meter for liquid or gaseous media, said flow meter comprising a measuring channel through which the medium flows, at least one inlet channel and at least one outlet channel and at least one pair of ultrasound converters for emitting and receiving ultrasound signals, at least one pair of reflectors is arranged in the measuring channel for guiding an ultrasound signal from one ultrasound converter to the other, the diameter of the measuring channel is reduced using a reducer in certain regions for guiding the flow of the medium, wherein the reducer is formed by a measuring channel ring insert positioned on the measuring channel inner wall between said reflectors, and which is used simultaneously for holding or fixing other functional parts.

2. Flow meter according to claim 1, wherein a measuring channel ring is provided as the reducer.

3. Flow meter according to claim 1 wherein the reducer comprises two reducer parts.

4. Flow meter according to claim 3, wherein the two reducer parts of the reducer are identical.

5. Flow meter according to claim 3 wherein the reducer parts are detachably connected.

6. Flow meter according to claim 3 wherein a reducer part comprises at least one pin, which engages in a corresponding borehole in the holding plate and/or in the other reducer part.

7. Flow meter according to claim 1 comprising a holding plate fixed in place by the reducer.

8. Flow meter according to claim 7 wherein the holding plate is provided for the arrangement of at least one pair of reflectors.

9. Flow meter according to claim 1 comprising a seal between the reducer and the measuring channel inner wall.

10. Flow meter according to claim 9 wherein the seal comprises at least one O-ring extending circumferentially around the reducer.

11. Flow meter according to claim 10 wherein the reducer comprises circumferential grooves, in which the O-ring is inserted.

12. Flow meter according to claim 1 wherein the reducer has at least one groove, which runs essentially in the flow direction in the region of the ultrasound converter.

13. Flow meter according to claim 1 wherein the groove is arranged on the outer side of the measuring channel ring.

14. Flow meter according to claim 13 wherein the O-ring is inserted in the groove.

15. Flow meter according to claim 1 wherein the grooves are annular.

16. Flow meter according to claim 1 wherein the reducer and the reflectors are arranged in such a way that the laminar flow of the medium is hardly influenced.

17. Flow meter according to claim 1 wherein the inlet-side reflector is inclined less towards the axis of the measuring channel running in the longitudinal direction than the outlet-side reflector.

18. Flow meter according to claim 1 comprising a non-centrical reducer whose open inner region is positioned out of the center of the measuring channel.

19. Flow meter according to claim 1 wherein the measuring section runs in the open inner region of the reducer.

20. Flow meter according to claim 1 wherein the reflectors and/or the reflector holders are punched out of the holding plate at least in certain places and bent.

21. Flow meter according to claims 1 or 7 wherein the reflectors are inclined from the plane of the holding plate towards the center of the open inner region of the reducer.

22. Flow meter according to claim 1 comprising an asymmetrical reducer whose opposite border regions each change their inclination continuously in mutual opposition.

23. Flow meter according to claim 1 comprising an oblique reducer whose wall thickness changes continuously over the width of the reducer, wherein the wall thickness in the cross-section of the reducer increases on one side and reduces on the opposite side.

24. Flow meter according to claim 1 wherein the reducer is a single part.

25. Flow meter according to claim 1 wherein the reflector holders or reflectors are connected to the holding plate by means of bars.

26. Flow meter for liquid or gaseous media, said flow meter comprising a measuring channel, through which the medium flows, at least one inlet channel and at least one outlet channel and also at least one pair of ultrasound converters for emitting and/or receiving ultrasound signals, wherein at least one pair of reflectors is arranged in the measuring channel for conducting an ultrasound signal from one ultrasound converter to the other ultrasound converter, a reducer positioned in the measuring channel and a flow guide plate provided to serve wherein the flow guide plate serves as a holding plate for the pair of reflectors and stretches in the longitudinal direction to the measuring channel.

27. Flow meter according to claim 26 wherein the length of the holding plate essentially corresponds to the length of the measuring channel.

28. Flow meter according to claim 26 wherein the holding plate partially engages the grooves of the measuring channel inner wall.

29. Flow meter according to claim 26 wherein the holding plate is connected to the measuring channel inner wall by holding devices on the corner regions of the holding plate.

30. Flow meter according to claim 29 wherein the holding devices comprise locking pins arranged with their long sides on the respective border region of the holding plate.

31. Flow meter according to claim 30 comprising a measuring channel ring arranged in the measuring channel and the holding plate is connected to said measuring channel ring.

32. Flow meter according to claim 29 wherein the holding plate stretches diametrically through the measuring channel.

33. Flow meter according to claim 26 wherein the holding plate comprises reflector holder for the reflectors.

34. Flow meter according to claim 33 wherein the reflector holders are shaped in a manner so as to optimize the flow.

35. Flow meter according to claim 33 wherein the surfaces of the ultrasound converters and/or of the reflectors and/or of the reflector holders are non-stick coated.

36. Flow meter according to claim 33 wherein the reflector holders can be detachably connected to the holding plate.

37. Flow meter according to claim 33 wherein one reflector holder is two-part, wherein a first reflector holder part comprises pins, which penetrate in boreholes of the holding plate and engage in corresponding boreholes of a second reflector holder part positioned on the other side.

38. Flow meter according to claim 33 wherein the reflectors are each arranged in a receptacle of the reflector holder.

39. Flow meter according to claim 33 wherein the reflectors are covered by a wall region.

40. Flow meter according to claim 33 wherein the reflectors or the reflector holders are components of the holding plate.

41. Flow meter according to claim 33 wherein the reflectors and/or the reflector holders are punched out of the holding plate, at least in certain regions, and bent.

42. Flow meter for liquid or gaseous media, said flow meter comprising a measuring channel through which the medium flows, at least one inlet channel and at least one outlet channel and also at least one pair of ultrasound converters for emitting and receiving ultrasound signals, wherein for guiding an ultrasound signal from one ultrasound converter to the other ultrasound converter, at least one pair of reflectors is arranged in the measuring channel wherein at least two measuring sections each having a pair of reflectors and a pair of ultrasound converters is provided, and a reducer positioned between said reflectors.

43. Flow meter according to claim 42 wherein the pairs of ultrasound converters are connected in parallel.

44. Flow meter according to claim 42 wherein the ultrasound is guided in a U-shape from one ultrasound converter via the reflectors of a pair of reflectors to the other ultrasound converter.

45. Flow meter according to claim 42 wherein the measuring sections are separated from one another, at least in certain regions, by a holding plate, on which the reflectors are arranged.

46. Flow meter according to claim 42 wherein the holding plate having the reflectors and/or reflector holders is embodied mirror-symmetrically.

47. Flow meter according to claim 42 wherein at least one pair of reflectors and/or one pair of reflector holders is arranged on each side of the holding plate.

48. Flow meter according to claim 42 wherein the holding plate is open in a region between the reflectors of one pair.

49. Flow meter according to claim 42 wherein a displacement member is arranged in the center of the measuring channel.

* * * * *

UNITED STATES PATENT AND TRADEMARK OFFICE
CERTIFICATE OF CORRECTION

PATENT NO.        : 7,287,437 B2
APPLICATION NO. : 11/353744
DATED             : October 30, 2007
INVENTOR(S)       : Kroemer et al.

It is certified that error appears in the above-identified patent and that said Letters Patent is hereby corrected as shown below:

Col. 9, line 26; delete "pate" and replace with "plate".

Col. 14, line 42, Claim 26; add "," after the first occurrence of the word "plate" and delete "provided to serve".

Signed and Sealed this

Third Day of February, 2009

JOHN DOLL
*Acting Director of the United States Patent and Trademark Office*